(12) United States Patent
Baratta

(10) Patent No.: US 12,741,329 B2
(45) Date of Patent: Sep. 22, 2026

(54) BLADE ASSEMBLY WITH VENTILATION OPENINGS

(71) Applicant: BARON INVESTMENTS, LLC, Oxnard, CA (US)

(72) Inventor: Anthony Baratta, Oak Park, CA (US)

(73) Assignee: BARON INVESTMENTS, LLC, Oxnard, CA (US)

( * ) Notice: Subject to any disclaimer, the term of this patent is extended or adjusted under 35 U.S.C. 154(b) by 79 days.

(21) Appl. No.: 18/983,149

(22) Filed: Dec. 16, 2024

(65) Prior Publication Data

US 2025/0296164 A1 Sep. 25, 2025

Related U.S. Application Data

(63) Continuation of application No. 18/126,387, filed on Mar. 25, 2023, now Pat. No. 12,179,277, which is a continuation of application No. 17/174,359, filed on Feb. 12, 2021, now Pat. No. 11,612,946.

(60) Provisional application No. 62/975,729, filed on Feb. 12, 2020.

(51) Int. Cl.
*B23D 59/02* (2006.01)
*B23D 61/02* (2006.01)

(52) U.S. Cl.
CPC ........... *B23D 59/02* (2013.01); *B23D 61/026* (2013.01)

(58) Field of Classification Search
CPC .... B23D 45/10; B23D 45/143; B23D 45/165; B23D 59/02; B23D 61/025; B23D 61/026
USPC ........................................................... 83/169
See application file for complete search history.

(56) References Cited

U.S. PATENT DOCUMENTS

| | | | | |
|---|---|---|---|---|
| 212,813 | A | 3/1879 | Miller | |
| 2,047,649 | A | 7/1936 | Robinson | |
| 2,807,256 | A | 9/1957 | Woolley | |
| 4,106,382 | A | 8/1978 | Saljéet al. | |
| 4,333,371 | A | 6/1982 | Matsuda | |
| 5,197,453 | A * | 3/1993 | Messina | B23D 61/026 76/112 |
| 5,555,788 | A | 9/1996 | Gakhar et al. | |
| 5,758,561 | A | 6/1998 | Curtsinger et al. | |
| 5,896,800 | A | 4/1999 | Curtsinger et al. | |
| 6,158,323 | A | 12/2000 | Asada | |
| 6,517,427 | B1 | 2/2003 | Yoshikawa et al. | |
| 6,705,188 | B2 | 3/2004 | Gravely et al. | |
| 7,299,727 | B2 | 11/2007 | Gravely et al. | |
| 11,612,946 | B2 | 3/2023 | Baratta | |
| 12,179,277 | B2 | 12/2024 | Baratta | |
| 2003/0029296 | A1 * | 2/2003 | Donazzan | B23D 61/026 83/835 |
| 2006/0016315 | A1 | 1/2006 | Zorich et al. | |
| 2006/0213495 | A1 | 9/2006 | Gaida et al. | |
| 2014/0298963 | A1 | 10/2014 | Ruzich | |
| 2017/0299727 | A1 | 10/2017 | Irish et al. | |

(Continued)

FOREIGN PATENT DOCUMENTS

| | | |
|---|---|---|
| DE | 2161212 | 6/1972 |
| DE | 9310499 | 9/1993 |
| EP | 0144468 | 6/1985 |

(Continued)

*Primary Examiner* — Omar Flores Sanchez
(74) *Attorney, Agent, or Firm* — Henricks Slavin LLP

(57) ABSTRACT

A blade assembly is formed from multiple blades assembled adjacent each other with openings in respective blades arranged to form a passageway passing through adjacent blades.

15 Claims, 6 Drawing Sheets

(56) References Cited

U.S. PATENT DOCUMENTS

2019/0030754 A1 * 1/2019 Baratta .................. B28D 1/122

FOREIGN PATENT DOCUMENTS

| | | |
|---|---|---|
| FR | 813109 | 5/1937 |
| FR | 2659892 | 9/1991 |
| RU | 2131336 | 6/1999 |

* cited by examiner 250
240
120
230
250
300
120
122
300
300A
150A
132
130
300
300A
150A
304

100
136

BLADE ASSEMBLY WITH VENTILATION OPENINGS

CROSS REFERENCE TO RELATED APPLICATIONS

This application is a Continuation of application Ser. No. 18/126,387, filed Mar. 25, 2023, now U.S. Pat. No. 12,179,277 issued Dec. 31, 2024, which is a Continuation of application Ser. No. 17/174,359, filed Feb. 12, 2021, now U.S. Pat. No. 11,612,946, issued Mar. 28, 2023, which claims priority from U.S. 62/975,729, filed Feb. 12, 2020, the entire contents of which are incorporated herein by reference.

BACKGROUND

Field

These inventions relate to working blade assemblies configured for fluid flow such as cooling flow through openings in the blades of the blade assembly, for example cooling of cutting, grinding or grooving blades.

SUMMARY

Methods and apparatus are described for a plurality of cutting blades to be aligned and assembled according to a common reference, such as a common reference on a blade driveshaft. In one example, the assembly includes at least first and second blade cores having respective first and second flow openings wherein the first flow opening has a first geometry, cross-sectional area, radial position and arcuate position relative to a common reference on the first blade core, which will be used with reference to the common reference on the blade shaft. The second flow opening has a second geometry, second cross-sectional area, second radial position and second arcuate position relative to a common reference on the second blade core, which will be used with reference to the common reference on the blade shaft. At least one of the first and second geometries, first and second cross-sectional areas, first and second radial positions and first and second arcuate positions are different from each other. The flow openings are positioned adjacent each other so as to form a passageway. In one configuration, the passageway has a central axis that extends other than normal to a blade core. In another configuration, the passageway extends from a location closer to the blade shaft to a location farther away from the blade shaft. In a further configuration, the passageway changes in cross-sectional area between the first and second blade cores.

In another example, a plurality of cutting blades can be assembled into alignment according to a common reference and have first and second blade cores with a respective first and second flow openings forming a first passageway through the first and second blade cores, for example where the first passageway starts in a first annular portion of the first blade core. The first and second blade cores include further flow openings forming a second passageway wherein the second passageway starts in a second annular portion of the first blade core radially outward of the first annular portion. In one configuration, the first and second passageways extending across multiple blade cores across each other, with one progressing outward from an inner portion adjacent a blade shaft to an outer portion adjacent an outer perimeter, and the other regressing inward from an outer portion adjacent an outer perimeter to an inner portion adjacent the blade shaft.

In any of the foregoing methods and apparatus, first and second flow openings may have different cross-sectional areas, can have different radial positions, and have different arcuate positions, and/or have different geometries. In some configurations, the blade assemblies can have as many as 10 blade cores or even as many as 40 blade cores. Also in any of the foregoing methods and apparatus, a blade core can have a plurality of evenly distributed flow openings, and a blade core can have a first plurality of evenly distributed flow openings in an inner portion of the blade core and a second plurality of evenly distributed flow openings in an outer portion of the blade core. For example, the first plurality of flow openings can include five flow openings, and the second plurality of flow openings can include five flow openings.

These and other aspects of the methods and apparatus discussed herein can be considered in conjunction with the drawings, a brief description of which follows.

DETAILED DESCRIPTION

Figure 1:
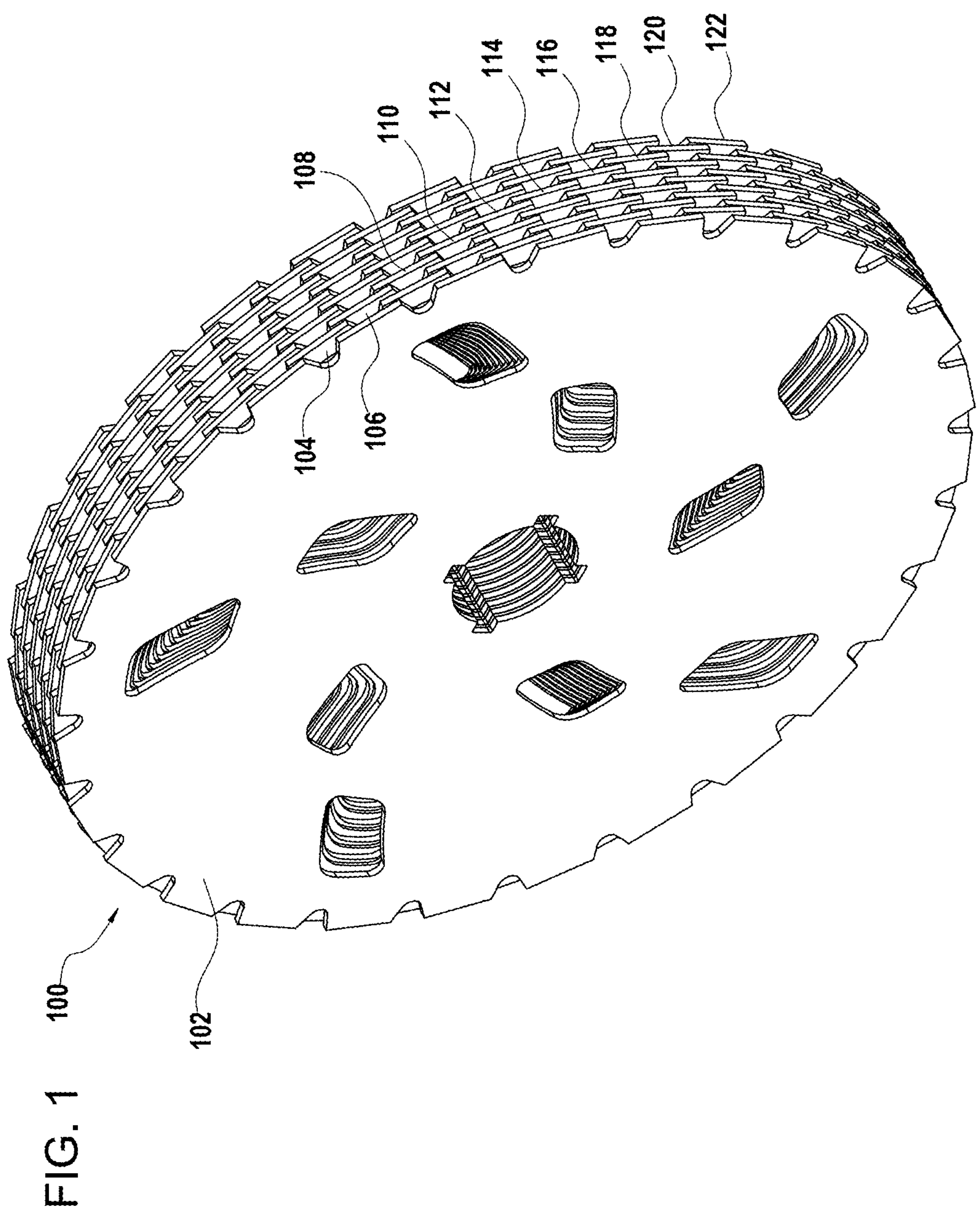
FIG. 1 is an upper isometric view of a blade assembly showing one example for cooling blades in the blade assembly.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples are provided of blade assemblies by way of illustration using an assembly of blade cores to which would be attached working surfaces such as diamond matrix material, cutting segments, carbide tips or other working materials, it being understood that the blade cores described herein are intermediate components to which the working materials would be added to form the final product for use on a blade assembly. The phrase "blade core" as used herein can apply to a blade core without working surfaces yet attached, or to a blade core to which working surfaces have been attached. A blade in the form of an assembly of a blade core with working surfaces attached can be considered the final working tool, but the term "blade" can be used herein to include a blade core alone or a blade assembly having working surfaces. Blade cores are formed with openings and then assembled together so that coolant flow can pass through and between blades in the blade assembly through the openings, to provide cooling. In one example, openings are formed in blade cores in such a way that when the blade cores are assembled as an assembly, for example on a blade shaft, openings align to form a passageway having the desired characteristics. In one example, the passageway starts on one blade at a first radial position on the blade and the passageway terminates on another blade at a second radial position, and in one example, the second radial position is closer to a perimeter of the blade assembly than the first radial position, and in another example the second radial position is farther from the perimeter of the blade assembly than the first radial position. In another example or in the same example, a passageway starts with an opening on one blade having a first cross-sectional area, and extends to another blade having a second cross-sectional area different than the first cross-sectional area, for example a larger cross-sectional area than the first cross-sectional area. In another example or in any one or more of the preceding examples, the passageway starts on one blade on which an opening is formed and oriented in a first configuration relative to a core radius passing through the opening, and ends on another blade on which an opening is formed and oriented in a second configuration relative to a respective core radius passing through the opening different from the first configuration. In another example or in any one or more of the preceding examples, a passageway starts on one blade on which an opening is formed at a first arcuate location on the blade and ends on another blade on which an opening is formed at a second arcuate location different from the first arcuate location relative to a reference common to both blades, for example an arcuate position on a blade shaft supporting the blade or blade portions to engage a blade shaft at respective axial positions at the same arcuate position. In another example or in any one or more of the preceding examples, a first passageway starts on one blade at a first radial position on the blade and terminates on another blade at a second radial position, and a second passageway starts on the other blade at a first radial position and terminates on the one blade at a second radial position, and the first radial positions may be the same or different and the second radial positions may be the same or different relative to a reference common to both blades. In any of these examples, cooling may be improved relative to a blade assembly configuration lacking openings or lacking openings configured according to one or more of such examples.

These and other benefits will become more apparent with consideration of the description of the examples herein. However, it should be understood that not all of the benefits or features discussed with respect to a particular example must be incorporated into a tool, component or method in order to achieve one or more benefits contemplated by these examples. Additionally, it should be understood that features of the examples can be incorporated into a tool, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

As used herein, "substantially" and "approximately" shall mean the designated parameter or configuration, plus or minus 10%. However, it should be understood that terminology used for orientation or relative position, such as front, rear, side, left and right, upper and lower, and the like, may be used in the Detailed Description for ease of understanding and reference, and may not be used as exclusive terms for the structures being described and illustrated.

Any one or more of the foregoing examples can be incorporated into blades assembled into a blade assembly, including any of the blade assemblies referenced herein. In the example illustrated in the drawings, aspects of each of the foregoing examples are incorporated into openings in blades and into the arrangement of blades making up the blade assembly. However, it is understood that a blade assembly can include fewer than all of the examples, or even only one of the examples described.

In the illustrated example, a blade assembly 100 (FIGS. 1-5) includes a plurality of blade cores 102, 104, 106, 108, 110, 112, 114, 116, 118, 120 and 122 (FIG. 1), which in the present example is a total of 11 blade cores, but a blade assembly can include any number of blades according to the work to be done and the equipment to be used. In FIG. 1, the blade core 102 will be considered for purposes of discussion and ease of reference only as a first blade core 102, and the blade core 104 will be considered a second blade core, and the blade core 122 will be considered a last blade core for ease of reference, but it is understood that a first and last blade core in an assembly can apply to any group of blade cores, for example a total of two blades or alternatively a total of 40 blades. In a blade assembly of a plurality of blades, there will be a first blade core and a last blade core, and each blade core will have at least one adjacent blade core. Additionally, the first and second blade cores 102 and 104 are considered adjacent blade cores, and other blade cores next to each other are considered adjacent blade cores, and references to adjacent blade cores can apply to any set of blade cores in an assembly, for example first and second blade cores or first, second and third blade cores (such as where the first and third blade cores are adjacent the second blade core). The phrase "adjacent blade cores" refers to blade cores configured to work on the same workpiece (such as by being mounted on a common driveshaft) and wherein there is no additional blade core between such blade cores.

Figure 2:
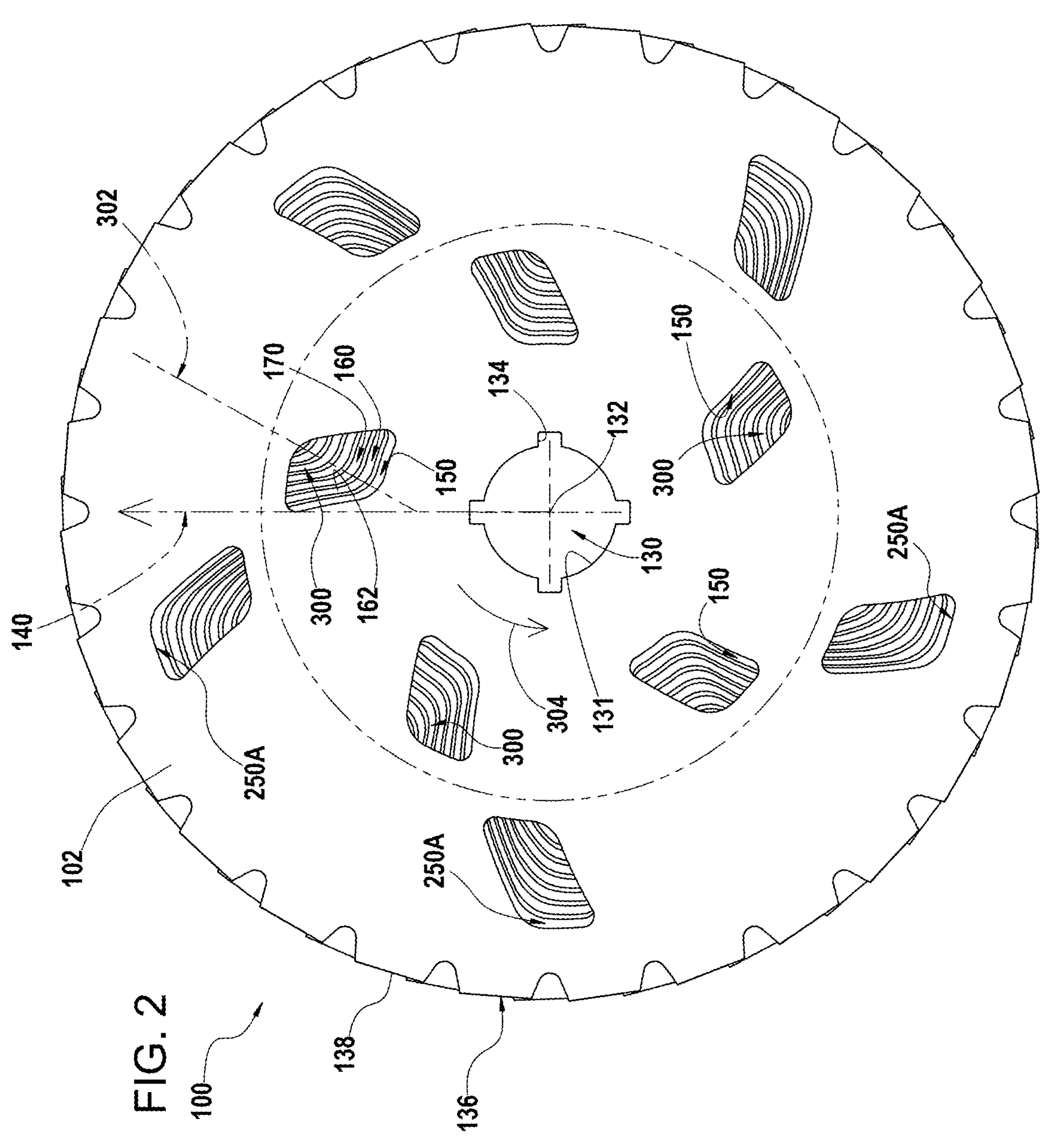
FIG. 2 is a front elevation view of the blade assembly of FIG. 1.
Figure 6:
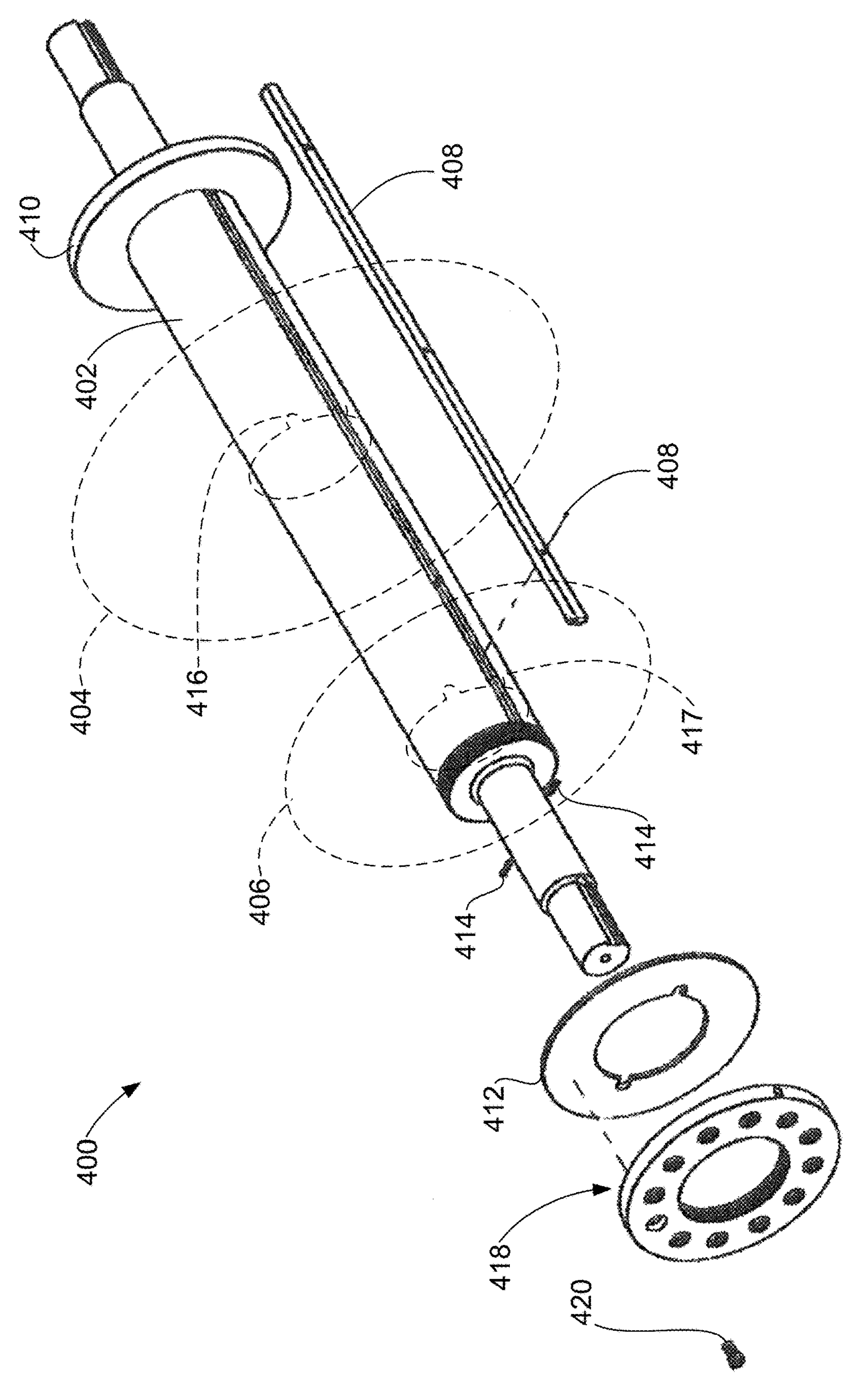
FIG. 6 is an upper isometric and schematic view of one type of blade shaft that can be used to support a plurality of blades.

In the illustrated example, each of the blade cores are identical except as otherwise described herein, it is understood that they can be different in other ways, such as by one or more of the examples described above. Each blade core includes a drive shaft opening 130 in the center 132 of the blade core (FIG. 2) having a diameter defined by a wall 131. The center 132 is coincident with a center axis of a driveshaft used to support and drive the blades. The drive shaft opening allows each of the blade cores to be assembled onto a driveshaft (FIG. 6), for supporting the blade core and driving the blade assembly. The drive shaft opening includes one or more key or pin slots 134, and in one example one slot can be unique relative to any others so that a blade can be assembled on the shaft and pin, key, or other reference element in only a single configuration so that all blade cores assemble into an assembly with the desired opening and passageway configuration. A pin slot allows the desired positioning on the blade shaft for one blade core relative to each of the other blade cores, according to the design configuration, and generally also is used to help drive the blades. Each blade core includes a perimeter 136 with support surfaces 138 to which are attached working elements, for example diamond cutting segments, diamond matrix material, carbide tips, or other working materials (not shown). Each blade is substantially circular and extends radially outward from the wall 131 out to the perimeter 136, for example along a radius 140 (FIG. 2).

The first blade core 102 includes at least one opening, and in the illustrated configuration a plurality of openings 150 formed by a wall 152 extending around a perimeter of the opening to define the geometry and cross-sectional area of the opening 150. In the present example, the first blade core 102 includes at least two (such as diametrically opposite or equally spaced apart from each other) and as illustrated five such openings 150 substantially evenly distributed about the blade core with uniform spacing, though it is understood that the blade core, and each of the blade cores, can have one or more such openings. The openings 150 in the illustrated configuration of the first blade core are closer to the blade shaft opening 130 than to the perimeter 136, but can be positioned at a number of locations on the annulus of the blade core between the blade shaft opening 130 and the perimeter 136. In the present example, each of the five openings is formed identically to the others in the group of five openings, having the same geometry, cross-sectional area, radial position, and substantially evenly spaced arcuately.

The second blade core 104 can include an opening 160 formed by a wall 162 extending around a perimeter of the opening to define the geometry and cross-sectional area of the opening 160. The opening 160 can have a characteristic of a geometry, cross-sectional area, and radial and arcuate positions on the second blade core the same as the geometry, cross-sectional area, radial and arcuate positions of the opening 150 on the first blade core, or the opening 160 can be different in one or more of the geometry, cross-sectional area, or radial or arcuate positions from those characteristics of the respective openings 150 to which they are adjacent. In the illustrated example, the opening 160 has a slightly different geometry, slightly different cross-sectional area, and has a geometric center that is positioned differently radially and arcuately relative to a geometric center of the opening 150, as described more fully below. In the illustrated example, the second blade core 104 includes five openings 160, and though they need not be identical and may be different in one or more characteristics of geometry, cross-sectional area, radial and arcuate position, they are identical in the present example in geometry, cross-sectional area and respective radial and arcuate positions relative to each other, which would be slightly different than the respective characteristics of the openings 150 to which they are adjacent.

As described in the two preceding paragraphs regarding the first blade core 102 and the second blade core 104, the adjacent blade cores 102 and 104 have at least one and in the illustrated example 5 pairs of adjacent openings. An opening in an adjacent blade core, such as second blade core 104, is different from its respective adjacent opening in the other of the two adjacent blade cores, such as the first blade core 102, in at least one of the opening geometry, cross-sectional area, radial position or arcuate position. In the illustrated example, the opening in the adjacent blade core (second blade core 104) is different from the adjacent opening in the adjacent blade core (first blade core 102) in each of its opening geometry, cross-sectional area, radial position and arcuate position. However, they can be identical or they can be different in any one or more of those four characteristics. Additionally, to the extent one opening in the adjacent blade core (second blade core 104) is different from a respective adjacent opening in the adjacent blade core (first blade core 104), one, more or all of the openings 160 can be (but need not be) different from their respective adjacent openings 150 in the same way. Furthermore, changes between one opening in a blade core and a respective adjacent opening in adjacent blade core (for example a change from opening 150 in blade core 102 to opening 160 in blade core 104) can define a progression of changes in openings between adjacent blade cores from a first blade core to a last blade core. In one example, the progression can be defined by a change between adjacent blade cores that is constant, either increasing or decreasing, or the progression can be defined by a change that is other than constant, either increasing or decreasing. Where a blade assembly has two blades, the progression will be a single increase or decrease, but where a blade assembly has many more than two blades, the progression will have (N−1) increases or decreases, wherein N is the number of blades. In the present example, the progression can be changes in one, more or all of the opening geometry, cross-sectional area, radial position and/or arcuate position.

Just as the first and second blade cores 102 and 104 are adjacent blade cores having openings wherein an opening 160 in the adjacent blade core 104 is different from the respective adjacent opening 150 in the adjacent blade core 102, the second and third blade cores 104 and 106 are adjacent blade cores having openings wherein an opening 170 in the adjacent blade core 106 is different from the respective adjacent opening 160 in the adjacent blade core 104. The same comments apply to the adjacent blade cores 104 and 106 and their respective openings as were made with respect to the adjacent blade cores 102 and 104. Similarly, the same comments apply to all of the other adjacent blade cores in the blade assembly (numbered progressively increasing from 102 to 122, with openings 150 to 250, with variations in one or more of the opening geometry, cross section, radial position and/or arcuate position progressing in an increasing or decreasing way).

Each of the blade cores in the illustrated assembly, 102-122, may include openings that are identical in all characteristics to the openings 150 and 160 described with respect to the first and second blade cores 102 and 104, respectively. However, in the present example, each of the blade cores in the illustrated assembly, 102-122, include openings that form a progression similar to the progression formed by openings 150 and 160 described with respect to the first and second blade cores 102 and 104, respectively. The eleventh blade core 122 (FIG. 4) includes at least one, and as illustrated, a plurality of openings 250, where the openings 250 have at least one characteristic different than the adjacent opening 240 on the adjacent tenth blade core 120, which in turn is different in one or more characteristics to a next adjacent opening 230 in the adjacent ninth blade core, and the progression continues for each adjacent blade core back to the first blade core 102 and opening 150 as they are confluent. In the illustrated example, an opening 150 and its adjacent opening 160 are different from each other in geometry, cross-sectional area, radial position and arcuate position, as are the opening 160 and the next adjacent opening 170 on the third blade core 106, and so on for each pair of adjacent blade cores. When one or more opening characteristics are different as between adjacent openings in the illustrated configuration, adjacent openings have at least a portion of a perimeter wall that overlaps or covers a portion of a perimeter wall on the next adjacent opening. Additionally, with different cross-sectional areas, or a progression in the cross-sectional areas (either increasing or decreasing), flow dynamics vary through adjacent openings, which may assist in flow through adjacent blade cores. In one example, the cross-sectional areas of the openings between opening 150 and opening 250 increase from 150 to 250, and in the illustrated configuration are positioned at increasing radial positions relative to the center axis 132, and are positioned at increasing arcuate positions, for example if the radius 140 were considered 0°.

In the illustrated configuration, all of the five openings 150 on the first blade core 102 have substantially identical characteristics relative to each other, and all of the five openings 160 on the second blade core 104 have substantially identical characteristics relative to each other, which are slightly different from those characteristics of the openings 150, and which in turn are slightly different from those characteristics of the openings 170 on the third blade core 106. The progression is similar for each set of five openings on a given blade core from one adjacent blade core to the next, continuing out to the eleventh blade core 122 (FIG. 4).

In the present example, each of the blade cores have the same number of openings. Additionally, each set of openings on a blade core are substantially identical in all of their characteristics. However, it is understood that desired configurations may have openings in a set of openings on a blade core different from each other in one or more characteristics, and that desired configurations may have adjacent openings on adjacent blade cores identical or different in one or more characteristics.

Figure 3:
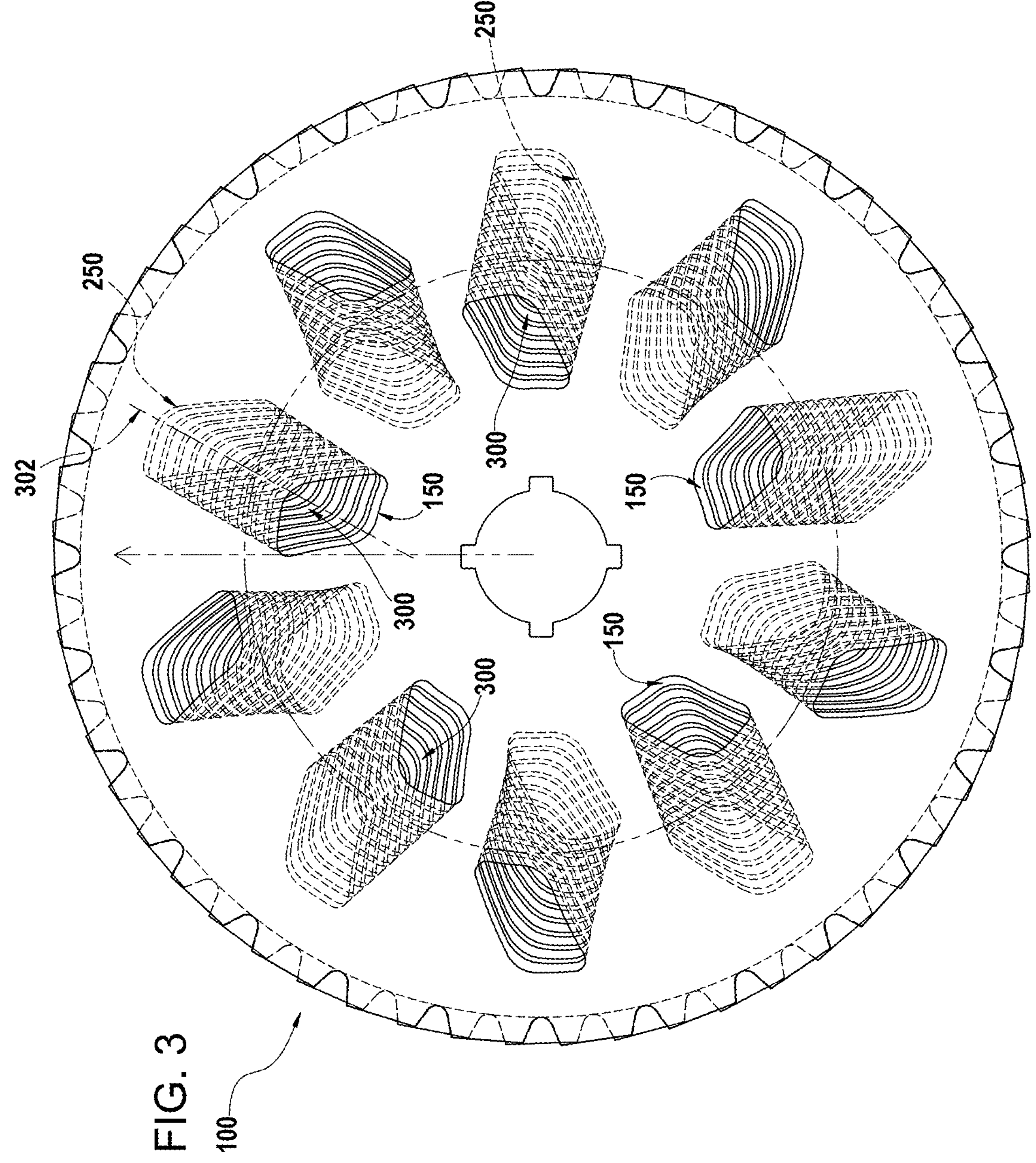
FIG. 3 is the view of FIG. 2 showing hidden lines for openings in the blades of the blade assembly.
Figure 4:
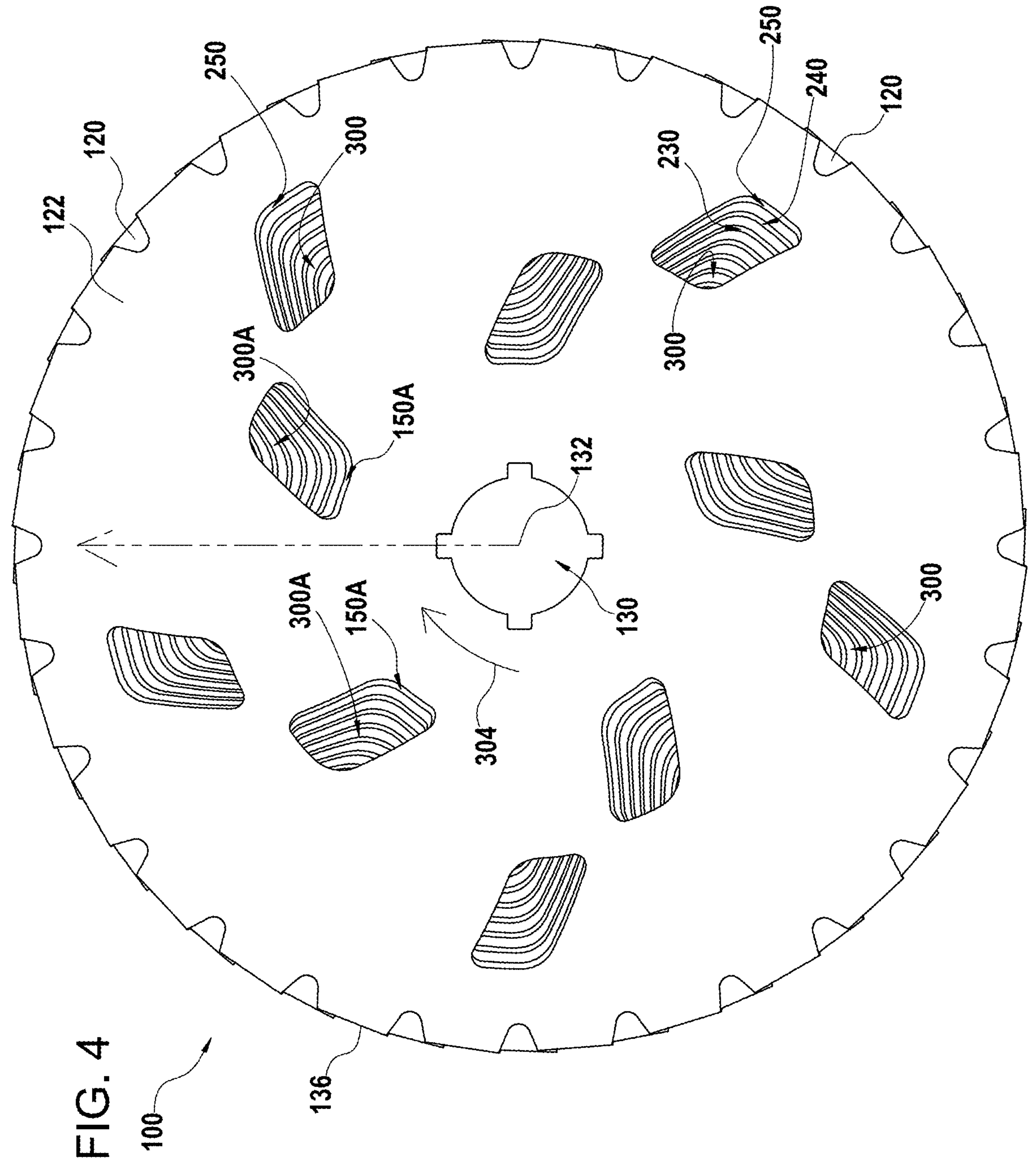
FIG. 4 is a rear elevation view of the blade assembly of FIG. 1.
Figure 5:
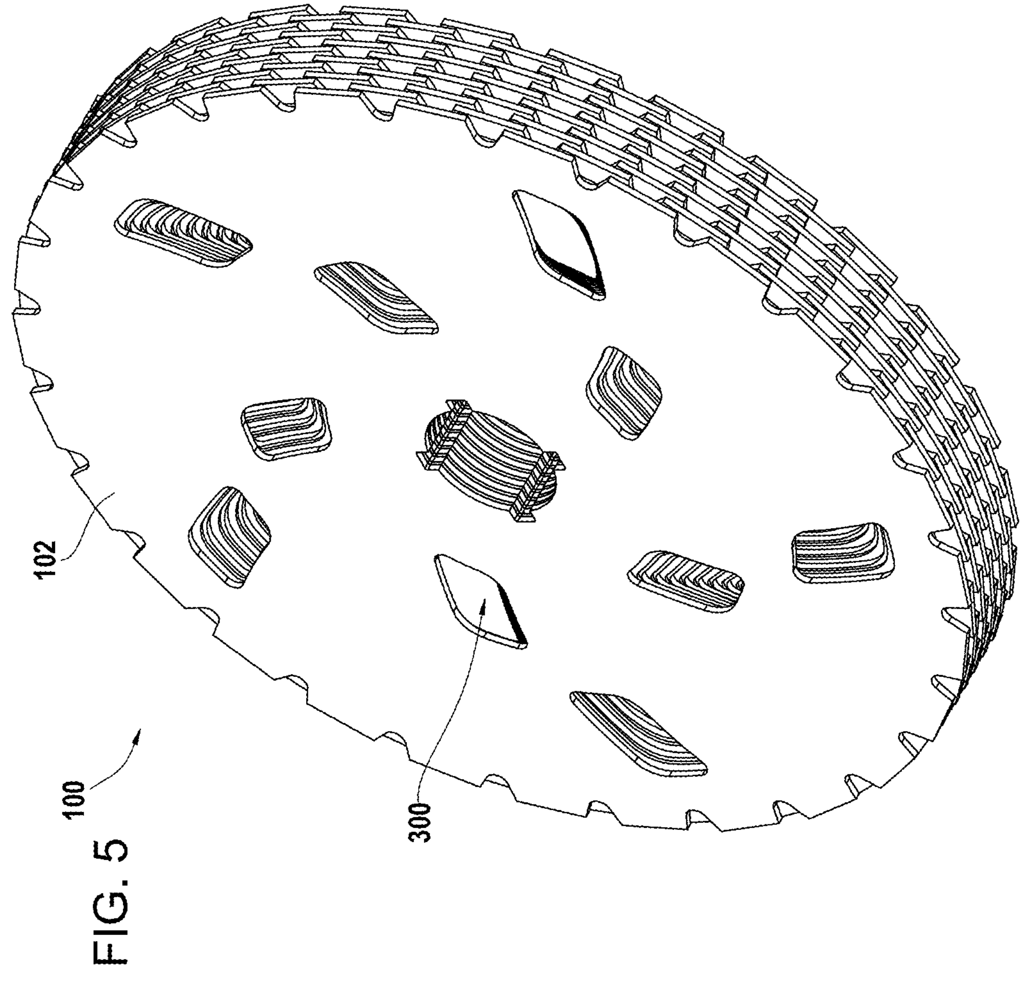
FIG. 5 is a side isometric view of the blade assembly shown in FIG. 1.

The set of openings 150, 160 all the way to the set of openings 250 on the eleventh blade core have their characteristics selected in such a way as to form a plurality of first passageways 300 (FIGS. 2-4). The first passageway 300 is defined by the accumulated geometries of respectively adjacent openings 150, 160, etc., out to the opening 250, and the passageway 300 can be considered to be defined by an axis 302 passing through or intersecting a geometric center of each of the openings 150, 160, etc., to the opening 250. In the illustrated configuration, the axis 302 is illustrated for simplicity as being straight, but it is understood that the axis curves as a function of the variations in the characteristics of the openings as they progress from the first blade core 102 to the eleventh blade core 122. As can be seen in FIG. 5, the passageway 300 is not precisely straight, and the axis 302 for the passageway 300 is not linear.

In the illustrated configuration, each passageway 300 begins with the opening 150 on the first blade core 102 at a position closer to the blade shaft opening 130, and ends up at the opening 250 in the eleventh blade core 122 at a radial position closer to the perimeter of the eleventh blade core than where the passageway started on the first blade core. Additionally, the passageway 300 begins at an arcuate position closer to 0° (for purposes of reference as illustrated), and ends up at the opening 250 in the eleventh blade core 122 at an arcuate position further away from 0°. In these configurations, and with a blade rotation as indicated at 304 (FIG. 2), cooling fluid such as air would be picked up in the opening 150 and flow through the passageway 300 and out the opening 250. Rotation may help to force air into the opening 150, and a lower pressure at the opening 250 may pull air through the passageway 300. The characteristics of each of the openings forming the passageway 300 as the openings progress from the opening 150 to the opening 250 along the axis 302 may also help airflow. Airflow from the inside out brings cooler air from adjacent the blade shaft to areas adjacent the perimeter where more cooling is desired in the area of the working surfaces. Additionally, airflow may enter or leave the passageway between adjacent blade cores.

The openings are formed in the respective blade cores 102 through 122 based on the desired radial and arcuate positions, and based on the desired opening characteristics, based on the center 132 and an arcuate position relative to a registration slot 134, such as the slot coinciding with the radius 140, which may be taken as 0°. In one example, the openings are formed in the blade cores in such a way that when the blade cores are assembled onto a shaft and registered through the registration slot 134 or other reference common to each blade, openings are sufficiently aligned to form the passageway 300, where each of the openings in respective blade cores have the desired geometry and cross-sectional areas, and they are positioned radially and arcuately to produce the passageway 300 as desired. As used herein, "reference common to each blade" means a reference on each blade that determines its position on a blade shaft such that when a plurality of blades are positioned on the blade shaft according to such common reference, the blades will be positioned arcuately relative to each other as desired. In the present examples, the reference common to each blade will be a slot or opening that engages a complementary structure on a blade shaft to arcuately fix each blade relative to the blade shaft. In the present example, the passageway 300 extends radially outwardly from the first blade core 102 to the eleventh blade core 122, and extends in a trailing direction relative to the direction of rotation 304. The openings are slightly aligned to the extent that they form a passageway, but one opening slightly overlaps an adjacent opening, either by having a different cross-sectional area or a different geometry or both. As noted above, the openings forming the passageway, for example passageway 300, can vary from each other in one or more characteristics, for example radial position, arcuate position, opening geometry or opening cross-sectional area.

A blade assembly such as that illustrated can have sets of openings forming a single passageway configuration, such as passageway 300. Such passageways can be uniformly distributed about a center 132 of the blade assembly, or they can start at different radial positions and end at different radial positions, and/or they can all start on the first blade core 102, but one or more can start at different radial positions and end at different radial positions. Where openings on respective blade cores are different from each other in one or more of geometry, cross-section, radial position or arcuate position, a line running through their geometric centers will extend generally other than normal to a given blade core. In the illustrated configuration, each passageway includes a respective line running through the geometric centers of the openings forming the passageway, and the lines extend at angles to the blade cores through which the passageway extends. As can be visualized in FIG. 3, the line 302 extend at angles to each of the blade cores. Therefore, line 302 is other than normal to those blade cores. There may also be configurations where the radial and arcuate positions of the openings forming a passageway may be the same while one or more of the geometries and cross-sections of the openings are different while keeping the geometric centers of the openings substantially aligned so that a line such as a geometric centerline may extend normal to each of the blade cores, for example parallel to the blade shaft.

Alternatively or additionally, openings in blade cores assembled into a blade core assembly as illustrated in FIGS. 1-5 have openings 150A starting on the eleventh blade core 122 closer to the blade shaft opening 130 than to the perimeter 136, and ending at openings 250A on the first blade core 102 at positions closer to the perimeter than to the blade shaft opening. In the present configuration, the openings 150A have identical characteristics as the openings 150, the openings 250A have identical characteristics to the openings 250, and likewise with the other openings 260, etc., in the other blade cores. Additionally or alternatively, they can be varied as desired in their characteristics just as the characteristics of the openings 150, 160, etc., to 250 can be varied. In the illustrated configuration, the openings 150A and their respective adjacent openings through to the opening 250A form a passageway 300A, which in the illustrated example is identical to the passageway 300 but in the opposite direction from the eleventh blade core to the first blade core. In the present example, the passageways 300 and 300A cross each other from a side view and provide similar cooling characteristics. Alternatively, the passageways 300 and 300A can be considered as both starting on the first blade core and the openings 150 through 250 progressing for the passageway 300 as described, and the passageway 300A progresses from the first blade core and decreasing in cross section, decreasing in radial distance from the center 134, and arcuately advancing from the first blade core 102 to the eleventh blade core 122. Alternatively, the passageways 300 and 300A can be considered as originating in the eleventh blade core 122.

In the illustrated configuration, each of the blade cores in the illustrated assembly have two sets of openings, for example the first blade core 102 includes a first set of openings 150 and a second set of openings 250A. Each of the first set of openings 150 are identical to each other and uniformly spaced apart, and each of the second set of openings 250A are also identical to each other and uniformly spaced apart. The first set of openings on a first outer blade core are positioned in an inner annulus, and the second set of openings on the first outer blade core are located in an outer annulus, and the outermost surfaces of the first set of openings 150 are positioned at a first radial position less than a radial position of the inner most surfaces of the second set of openings. The opposite occurs on the last blade core, which means in the present configuration, a passageway extends between an inner annulus and an outer annulus as the passageway extends between a first blade core and a last blade core. The progression of the first set of openings from the first blade core 102 to the adjacent blade core 104, and from each blade core thereafter to the next adjacent blade core, includes an increase in the surface area of the opening, a change in the geometry, a change in their radial position, and a change in the arcuate position. Similarly, the second set of openings progress in a similar way from the last blade core 122 to the first blade core 102. Therefore, the blade assembly includes a plurality of blade cores having first and second sets of openings having opposite progressions, or stated alternatively progressing in opposite directions. Additionally, the first and second sets of openings form passageways, adjacent ones of which crossover each other as viewed from a side of a blade assembly. Also, cross-sectional area of a passageway progresses in a positive sense radially outward as the passageway extends from a first blade core to a last blade core, and vice versa. Each passageway may be considered to have an approximate transverse cross-section approximate it by each blade core, though it is understood that a precise transverse cross-section of a given passageway may not be exactly parallel to a plane of a blade core, but only approximately.

The blade head can take a number of configurations, which may depend on the size of the machine and the work to be done. In one configuration, blade head or blade assembly can include a shaft and blade assembly 400 (FIG. 6) having a blade shaft 402, a plurality of blades represented generically at 404 and represented schematically in FIG. 6 but which can be any of the blades described herein assembled as described. The assembly may if desired, but need not, also include a plurality of spacers represented generically at 406, also represented schematically in FIG. 6, but they can take any number of configurations such as those used in wood cutting, grinding and grooving, concrete cutting and the like. The blades, and spacers if present, are supported on the core of the blade shaft and positioned in registration with one or more keys 408. In some configurations, each blade may be separated by a spacer so that blades and spacers alternate with each other, and a grinding or grooving head can have any number of blades, from fewer than 10 to more than 40, depending on the work to be done and the spacing desired for example in a grooving application. The assembly of blades (and any spacers) are placed or stacked against a stop plate 410 at one end of the blade shaft, and secured in place by a pressure plate 412, positioned circumferentially by setscrews 414. Upon assembly, the blades (and any spacers) are stacked against the stop plate 410 and in registration with the key 408 through one or another of a registration slot 416 in each blade (such us slots 134) or a registration slot 417 in the spacers, the pressure plate 412 placed against the last disc, and a compression plate 418 is threaded onto the end of the core of the blade shaft. A plurality of pressure screws 420 are then threaded into the compression plate and against the pressure plate 412 in order to place the blades under compression. The blade head can then be mounted on the machine for operation. All of the blade cores described herein are illustrated as being configured for mounting registration on a blade shaft or arbor such as that illustrated in FIG. 6 having one or more keys 408. However, it is understood that the blade cores, with or without spacers, and assemblies described herein can be configured for use on other blade shafts or arbors.

On assembly, the last blade core 122 can be fit over and end of the blade shaft 402 with a slot 134 (416 in FIG. 6) over the key 408 so that the blade core 122 is arranged on the blade shaft as desired. The blade core is positioned against the stop plate 410. After positioning a spacer, if used, the next blade core, in the present example blade core 120, is then arranged on the blade shaft aligning the slot with the key in the desired configuration so that respective adjacent openings form part of respective passageways. Additional spacers, if any, and blade cores are arranged on the blade shaft in a similar way so that slots are aligned with the key to produce the desired configuration so that respective adjacent openings form respective passageways according to the design. The pressure plate 412 and compression plate 418 are then applied as necessary to form a blade and shaft assembly. The assembly is then mounted on a drive assembly for cutting.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A method of assembling cutting blades on a blade shaft comprising placing first and second blades on the blade shaft so that respective reference elements on the first and second blades engage a complementary reference element on the blade shaft and wherein a first flow opening on the first blade has a first geometry and first cross-sectional area in the blade and first radial position and first arcuate position relative to the reference element on the first blade and a second flow opening on the second blade has a second geometry and second cross-sectional area in the blade and second radial position and second arcuate position relative to the reference element on the second blade, and wherein at least one of the second geometry, cross-sectional area, radial position and arcuate position is different from at least one of the first geometry, first cross-sectional area, first radial position and the first arcuate position.

2. The method of claim 1 wherein placing the first and second blades includes placing the first and second blades to have first and second flow openings different in cross-sectional area.

3. The method of claim 1 wherein placing the first and second blades includes placing the first and second blades to have the first and second radial positions different.

4. The method of claim 1 wherein placing the first and second blades includes placing the first and second blades to have the first and second arcuate positions different.

5. The method of claim 1 wherein the common reference is a slot in each of the first and second shaft walls and wherein placing the first and second blades includes placing respective slots of the first and second blades on a complementary structure on the blade shaft.

6. The method of claim 1 wherein placing the first and second blades includes placing the first and second blades that have the first and second flow openings positioned radially on the respective first and second blades on an inner annular portion of the respective blade cores, and the blades further include third and fourth flow walls defining third and fourth flow openings through an outer annular portion of the respective blade cores.

7. The method of claim 1 wherein the method includes placing on the blade shaft at least 10 blade cores.

8. The method of claim 1 wherein placing the first and second blades includes placing the first and second blades to have the first and second flow openings form a passageway having a transverse cross-section that is different for the first flow opening than the second flow opening.

9. The method of claim 1 wherein placing the first and second blades includes placing the first blade having five equally spaced apart flow openings.

10. The method of claim 1 wherein placing the first and second blades includes placing the first and second blades the blade shaft and a key element, and each of the blades is assembled on the blade shaft with a respective common reference on the blade core engaging the key element.

11. A method of assembling a cutting blade assembly having a blade shaft and first, second and third blade cores having respective blade shaft openings through which the blade shaft extends, wherein each of the first, second and third blade cores further include respective surfaces configured to engage a reference element on the blade shaft to position each of the first, second and third blade cores circumferentially on the blade shaft, the method comprising placing each of the first, second and third blade cores having respective first, second and third flow walls defining first, second and third flow openings in such a way as to define a first flow passageway extending other than parallel to the blade shaft, and with respective fourth, fifth and sixth flow walls in the first, second and third blade cores defining respective fourth, fifth and sixth flow openings defining a second flow passageway extending other than parallel to the blade shaft.

12. The method of claim 11 wherein placing includes placing the first, second and third blades so that a cross-sectional area of the first flow passageway increases from the first blade core to the third blade core, and a cross sectional area of the second flow passageway decreases from the first blade core to the third blade core.

13. The method of claim 11 wherein placing includes placing the first, second and third blades so that the cross-sectional area of the first flow passageway increases from the first blade core to the third blade core and the second flow passageway increases from the first blade core to the third blade core.

14. The method of claim 11 wherein placing includes placing the first, second and third blades so that the first flow passageway follows a path of increasing distance from the blade shaft.

15. The method of claim 11 wherein placing includes placing the first, second and third blades so that the second flow passageway follows a path of decreasing distance from the blade shaft.

* * * * *